(No Model.) 2 Sheets—Sheet 2.
G. WESTINGHOUSE, Jr.
COMBINED ELECTRIC AND FLUID PRESSURE MECHANISM.
No. 245,592. Patented Aug. 9, 1881.
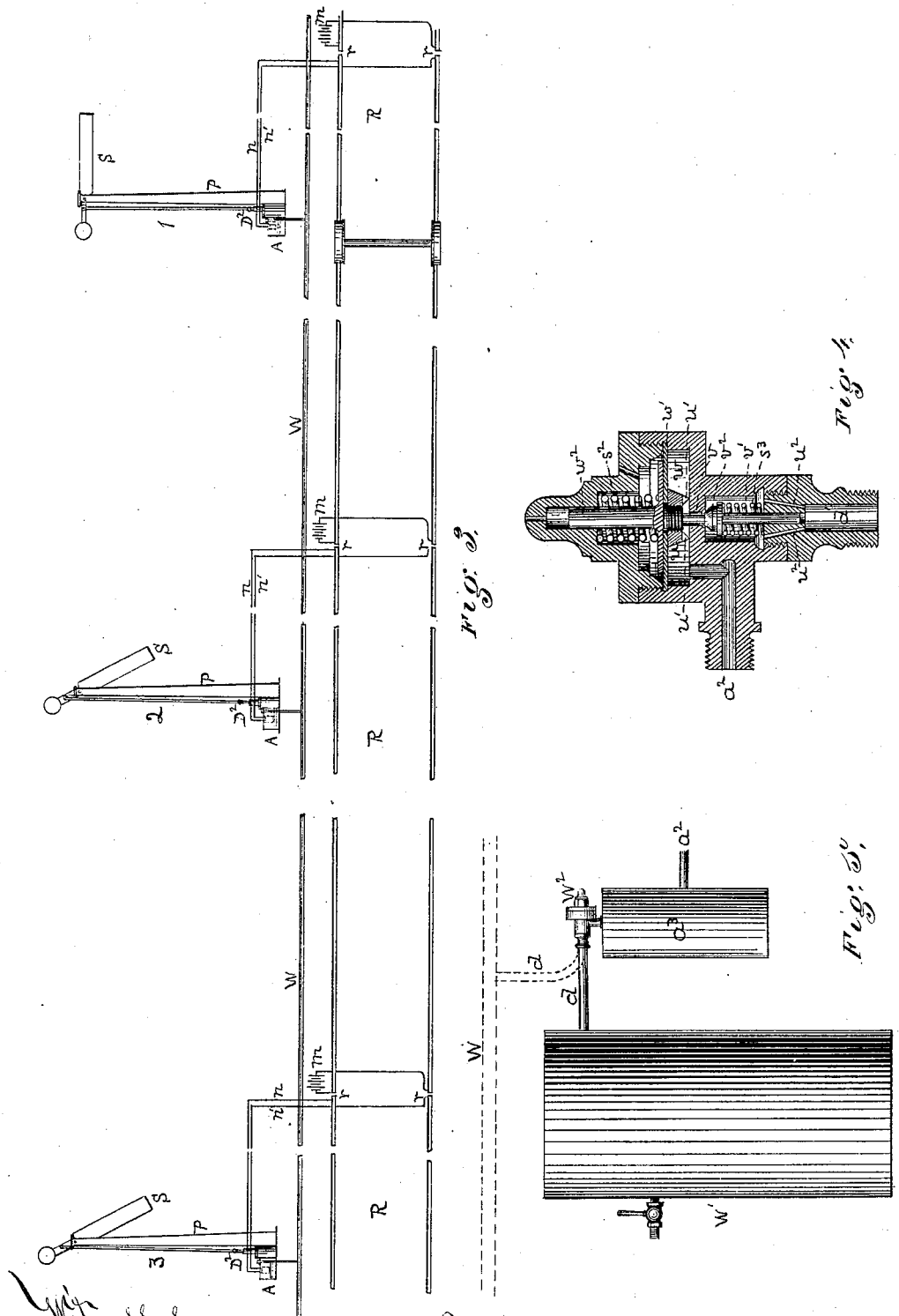

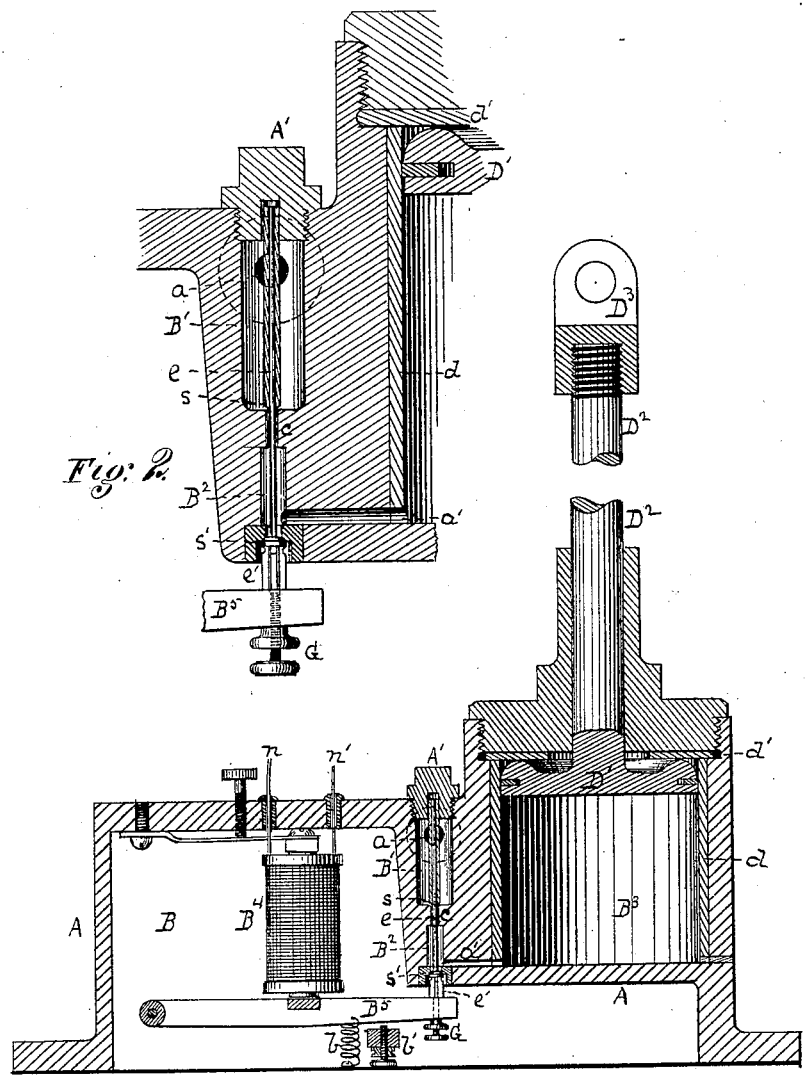

UNITED STATES PATENT OFFICE.

GEORGE WESTINGHOUSE, JR., OF PITTSBURG, PENNSYLVANIA.

COMBINED ELECTRIC AND FLUID-PRESSURE MECHANISM.

SPECIFICATION forming part of Letters Patent No. 245,592, dated August 9, 1881.

Application filed May 31, 1881. (No model.)

*To all whom it may concern:*

Be it known that I, GEORGE WESTINGHOUSE, Jr., of Pittsburg, county of Allegheny, State of Pennsylvania, have invented or discovered a new and useful Improvement in Combined Electric and Fluid-Pressure Mechanism; and I do hereby declare the following to be a full, clear, concise, and exact description thereof, reference being had to the accompanying drawings, making a part of this specification, in which—like letters indicating like parts—

Figure 1, Sheet 1, is a sectional elevation of an apparatus illustrative of my present invention. Fig. 2 is a detached view, to an enlarged scale, of a portion thereof, the better to show some of the details. Fig. 3, Sheet 2, illustrates, by a diagram view, one manner of using my invention in operating railway block-signals. Fig. 4 is an enlarged sectional view of one suitable form of regulating-valve and Fig. 5 further illustrates the manner of using my invention in connection with either a reservoir or a pipe-line.

My present invention relates, chiefly, to the use of fluid-pressure for actuating signals, switches, and other movable parts of a railway superstructure—such as gates, draw-bridges, and draw-bridge appliances—wherein the fluid-pressure is brought into and out of operation by a valve or equivalent device of like function operated by electrical or electro-magnetic action. While any suitable fluid-pressure may be employed, I prefer to use compressed air, and such compressed air may be supplied from any suitable air-compressing apparatus through a trunk line of pipe, which may extend any desired distance along the line of railway track or tracks, from point to point, where the use of such compressed air may be desired; or it may be taken directly from a reservoir arranged in convenient proximity to the place of use; or, as in the case, say, of a freight-yard or junction or crossing-point, the compressed air may be taken from a single reservoir common to all the switches or signals where its use is desired. As one convenient form, and one which I now believe to be the best, I have shown a box or casing, A, containing four chambers, B, B', B², and B³, the first of which, B, is for containing an electro-magnet, B⁴, and armature B⁵, the second and third, B' and B², I term "valve-chambers," and the fourth, B³, is a piston chamber or cylinder, in which is arranged a piston, D', the motion of which, in one direction or the other, is intended to actuate, by suitable interposed connections, the signal, switch, or other movable devices. In this case I have represented the piston-stem D², having an eye, D³, in its end, as a suitable connecting device for the purposes indicated. The piston D' is to be provided with suitable packing in its periphery, and to avoid rust I prefer to add a brass bushing, $d$, and I also add a gasket, $d'$, on which it may seat, so as to make a close joint at the end of its outward stroke. The pipe by which the fluid-pressure is supplied enters the valve-chamber B' by a side port, (shown at $a$, Figs. 1 and 2,) and when the apparatus is in use this port is always to be open.

The valve-chambers B' B² are connected by a small port, $c$, through which passes a valve-stem, $e$. So much of this stem $e$ as passes through the port $c$ is less in size or cross-section than the port itself. The valve-stem $e$ carries two valves, $s\ s'$, the one of which, $s$, has a seat on the upper end of the port $c$, seating downward, and the lower valve, $s'$, seats upward on the valve-seat, immediately at or near the lower end of the valve-chamber B², and these valves are arranged on the stem $e$ such distance from each other relative to the distance between their seats that only one can be closed at a time. The upper end of the valve-stem $e$, entering a socket bored in the cap A', has a suitable means for guiding it, and has also a projection, $e'$, at its lower end, bringing it within the range of operation of the armature B⁵, as presently to be described.

From the chamber B², at a point between the valves $s$ and $s'$, a port, $a'$, leads to the piston-chamber B³. Hence it will be seen that when the valve $s$ is unseated and the valve $s'$ is seated an open line of communication will be made from the source of fluid-pressure supply to the piston-chamber B³, so that such fluid-pressure entering the chamber B³ will actuate the piston thereof, and through it and its stem D² communicate motion to the signal, switch, or other movable appliance, and that with the valves reversed, so that $s$ shall be closed and seated and $s'$ unseated, the fluid-pressure is cut off and the escape open from B³ through the port a′ and the port of the valve s′ to any suitable waste. In order to give the valves s and s′ such motion or action, I employ an electro-magnet, B⁴, or any equivalent form or description of electro-magnetic appliance. Electric wires or conductors n n′, through which to make a circuit from any suitable circuit-closer or key at the operator's stand or cabin, which may be either close at hand or at a distance, provide means for bringing the electro-magnet into action, so that when the circuit is closed the armature B⁵ shall be attracted to its magnet, and its free end, engaging the projection e′ on the valve-stem e, shall seat the valve s′ and open the valve s, and thereby admit fluid-pressure to the piston-chamber B³, so as to give proper motion to the signal, switch, or other movable appliance. In this way a signal at a switch, either when it is near or distant, may be set in any desired position, and retained in such position as long as the electric circuit continues closed, and the same will be true of a switch, gate, or other movable appliance.

When it is desired to reverse the signal, switch, or gate, or other appliance, the electric circuit is broken in the usual way, which results in the releasing of the armature B⁵, and consequently the valve s is closed and the valve s′ is open, whereby the fluid-pressure is carried off to the waste-pipe, which is thereby opened from the cylinder B³.

A counter-weight or spring applied to the signal, switch, or other device, to be used in any of the ways known in the art, may be employed to secure the reversal of the device, and it will remain reversed until fluid-pressure is again applied in the manner set forth.

Ordinarily the valve s will be seated by gravity when the electric circuit is broken; but in case the apparatus should be constructed so that gravity will not do this work, the valve s′ may be made a little larger than the valve s, so that the excess of fluid-pressure thereon shall tend in the direction indicated; but the same result may be secured by the use of a spring or other equivalent appliance.

The armature B⁵ may be supplied with a retracting-spring, b, and an adjustable stop, b′, if desired or found necessary.

In the preferable construction of such apparatus the piston D′, when at the end of its stroke, under operation of fluid-pressure, should set and hold the signal to "safety," (when employed for signal use,) so that in case of any defect in the apparatus, such as leakage and defective or broken circuit, &c., the signal will be at or come to "danger;" but, if desired, the connections may be so made that this position will be reversed. Hence, in the use of this apparatus, I do not limit myself as to features of organization last referred to, nor do I limit myself to any particular device or arrangement of the apparatus relative to the appliance to be actuated.

The case A may be so set that the piston-stem D² shall be horizontal or vertical at pleasure. Also, the waste-port may be made separate from the supply-port a′, and upon and close by a separate valve device suitably operated for the purpose.

As it will be desirable in apparatus of this kind that the fluid-pressure admitted to the piston-chamber B³ shall be uniform, or nearly so, and as the pressure in the trunk supply-pipe or in the reservoir or reservoirs may be variable, particularly when two or more of these appliances are actuated by fluid-pressure from a common source, I prefer to arrange a pressure-regulating valve at any suitable point intermediate between the trunk-pipe or reservoir and the port a. To illustrate this I have shown in Fig. 5, by dotted lines, a trunk-pipe, W, such as above referred to, as also, by full lines, a main reservoir, W′, either of which (according as one or the other may be used) may have a capacity somewhat in excess of that required in the actual use of any one apparatus, and for illustration I will suppose such capacity to be one hundred pounds per square inch, and will also suppose that ten pounds per square inch pressure will be sufficient for actuating any one piston D′. Hence I arrange a pressure-regulator, as at W², at any desired point between the trunk-pipe W or the main reservoir W′ and the port a or the pipe a², leading thereto, and such regulator I adjust so that under the circumstances above supposed it shall close as soon as the piston-chamber B³ is charged with a pressure of ten pounds per square inch, and shall open when such pressure falls below that point. Hence in this way I not only secure a uniform working-pressure in the piston-chamber B³, but I also make provision for a working of two or more sets of my improved apparatus from a single trunk-pipe or a single main reservoir.

If it be desired to have a small chamber or reservoir of fluid-pressure between the regulator W² and the port a, it may be arranged as represented at a³.

Apparatus such as described may be combined with or have combined with it other appliances known in the art, whereby—say on the setting of the signal—another means, power, or agency may be brought into operation for shifting a switch, or the motion of the piston D′ may close or break another electric circuit, or move a valve or equivalent appliance for actuating another signal or switch, as the case may be. Hence the present invention is claimed, whether the apparatus embodying the same is used separately or in combination with other apparatus.

While any suitable form of pressure-regulator may be employed at W², I have shown in Fig. 4 one which I prefer. Here the supply-pipe d, leading from the reservoir W′ or from the trunk-pipe W, opens by a port, d′, through intermediate ports and passages, into a diaphragm-chamber, w, beneath a flexible diaphragm, $w'$. The stem $w^2$, to which the diaphragm is secured at its center, extends through a port, $v$, but does not fill the port, and through the valve-chamber $v'$, and carries a valve, $v^2$. Springs are added, as at $s^2$ $s^3$, of such power that when the pressure below the diaphragm $w'$ becomes excessive the diaphragm will rise, seat the valve $v^2$, and cut off the supply. As against a less pressure no effect will be produced, and the air will flow through port $d'$, ports $u^2$, valve-chamber $v'$, port $v$, and the notches or ports $w'$ in the nut $u$, to the pipe $a^2$, through the reservoir $a^3$, if such be used, and thence communication is made to port $a$ of the apparatus with the result already described.

In further illustration of one of many applications or modes of using my present invention, I have shown in Fig. 3, Sheet 2, its application to a close-circuited block system of railway-track. In this system the track R is divided up into sections or blocks, insulated from each other, as at $r$ $r$, but with each line of rails electrically connected between the points $r$. At or near one end of each section is a battery, $m$, the opposite poles of which are connected with the opposite lines of track-rails, and at or near the opposite end of each section is the signal apparatus A, arranged at or in convenient proximity to a signal-post, P, and so that the piston-stem $D^2$ may actuate a counterweighted semaphore, S; but in this organization the circuit-wires $n$ $n'$ are in electrical connection with the opposite lines of track-rails. Then, when the track is clear and the circuit through wires and rails is unbroken, the valve $s'$, Fig. 2, will be seated and $s$ will be unseated, so that by the outward movement of the piston the signals will be at "safety," as at stations 2 and 3 of Fig. 3; but when the wheels and axle of a train enter on a section—say from the right—they short-circuit or cut out the battery, which results in the release of the armature $B^5$ and the shifting of the signal to "danger," as at station 1, Fig. 3. In this diagram I have shown the fluid-pressure as being supplied from a main track pipe, W, as above described; but one or more reservoirs, one at each signal-post, may be substituted therefor. The wheels and axle here operate as and perform the functions of circuit closer and breaker.

As already suggested, additional devices may be added for making and breaking a new circuit at each piston stroke, so as to actuate another or distant signal; also, station and signal lights may be operated by carburetors taking air from the pipe W in the manner described in Patent No. 240,628, granted to me April 26, 1881.

With the explanation thus given the skilled constructer can readily adapt the apparatus described to the actuating of crossing, switch, station, and draw-bridge signals, as also to giving to switches their proper motions, to locking and unlocking draw-bridges, and, in fact, to moving any device by fluid-pressure, which pressure is capable of being brought into action by the making or breaking of an electric circuit, and for such uses any known suitable form of circuit-breaker may be employed, whether actuated by hand or by some mechanism of mechanical power; and the apparatus may also be employed on what are known as "overlapping block-sections," with such changes as will come within the knowledge of the skilled constructer.

In a separate application already filed I have described a like method of operation to that herein involved, and hence the present invention is limited to the features of construction and combination hereinafter claimed, including, of course, the mechanical equivalents of the devices named.

It may also be noted that the use of a pressure regulator enables me to economize air, so as not to waste any power in the operations described, and that the armature in operating the valves is never subject to any excessive resistance from the presence of undue air-pressure. It will also be practicable to discharge the waste air into a close box or chamber, so that it may be used to supply the carburetors.

If additional means of adjustment of the armature is required with reference to the valve, it may be secured by the use of a set-screw, G, as shown in Figs. 1 and 2.

I claim herein as my invention—

1. The combination of an electro-magnet and armature, a pair of valves naturally moving or pressed simultaneously in one direction and actuated by the armature simultaneously in the other direction, a single-acting piston, a signal actuated thereby, a supply-port opened, and a waste-port closed, by said valves when the armature is in one position, and vice versa when the armature is in the other position, substantially as set forth.

2. A case or box, A, composed of chambers B B' $B^2$ $B^3$, ports $a$ $c$ $a'$, in combination with piston D', valves and stem, armature and magnet, substantially as set forth.

3. Valves $s$ $s'$ on a common stem, $e$, having a projection, $e'$, to bring it within reach of the armature, in combination with continuously-open supply-port $a$, and with ports $a'$ $c$, intermittently opened and in reverse order, substantially as set forth.

In testimony whereof I have hereunto set my hand.

GEORGE WESTINGHOUSE, JR.

Witnesses:
R. H. WHITTLESEY,
GEORGE H. CHRISTY.